(12) United States Patent
Thomson et al.

(10) Patent No.: US 6,315,170 B1  
(45) Date of Patent: *Nov. 13, 2001

(54) DEVICE FOR DISPENSING GRANULAR MATERIAL

(76) Inventors: Susan A Thomson, 910 E. Overbluff, Spokane, WA (US) 99203; Jeffrey L Bendio, 13903 E. Sprague Ave. Ste 8, Spokane, WA (US) 99216

( * ) Notice: Subject to any disclaimer, the term of this patent is extended or adjusted under 35 U.S.C. 154(b) by 0 days.

This patent is subject to a terminal disclaimer.

(21) Appl. No.: 09/514,876

(22) Filed: Feb. 28, 2000

Related U.S. Application Data

(63) Continuation-in-part of application No. 09/411,722, filed on Oct. 1, 1999, now Pat. No. 6,271,366.

(51) Int. Cl.⁷ .................................................. G01F 11/10
(52) U.S. Cl. .......................................... 222/361; 222/359
(58) Field of Search ................................. 222/359, 360, 222/361, 362, 339, 370; 141/174, 175

(56) References Cited

U.S. PATENT DOCUMENTS

| | | | |
|---|---|---|---|
| D. 397,913 | * 9/1998 | Miliani | D7/589 |
| 1,046,957 | * 12/1912 | Brehm | 222/361 |
| 1,940,751 | * 12/1933 | Hermani | 221/108 |
| 2,363,155 | 11/1944 | Smith | 222/185 |
| 2,561,721 | 7/1951 | Ardito | 222/339 |
| 2,788,809 | 4/1957 | Paton | 141/353 |
| 2,857,083 | * 10/1958 | Masterson | 222/361 |
| 2,920,796 | 1/1960 | Field | 222/185 |
| 3,092,292 | 6/1963 | Mayer | 222/185 |
| 3,169,675 | 2/1965 | Gutzmann | 222/360 |
| 3,211,334 | 10/1965 | McShea | 222/39 |
| 4,109,835 | 8/1978 | Castro | 222/449 |
| 4,168,019 | 9/1979 | Hausam | 222/185 |
| 4,174,058 | * 11/1979 | Bassignani | 222/438 |
| 4,266,695 | 5/1981 | Ruperez | 222/185 |
| 4,322,017 | * 3/1982 | Lowdermilk | 222/43 |
| 4,394,941 | 7/1983 | Recine | 222/355 |
| 4,448,331 | 5/1984 | Millette | 222/181 |
| 4,769,011 | * 9/1988 | Swaniger | 604/218 |
| 5,437,393 | 8/1995 | Blicher | 222/77 |
| 5,437,396 | 8/1995 | Russillo | 222/185.1 |
| 5,758,803 | 6/1998 | Liao et al. | 222/440 |
| 5,823,398 | 10/1998 | Russillo | 222/185.1 |
| 5,855,300 | 1/1999 | Malki | 222/153.09 |
| 6,189,742 | * 2/2001 | Thomson et al. | 222/339 |

* cited by examiner

*Primary Examiner*—Kevin Shaver  
*Assistant Examiner*—Melvin A. Cartagena  
(74) *Attorney, Agent, or Firm*—David S. Thompson

(57) ABSTRACT

A dispensing device is adapted for release of a measured quantity of granular material. A base is generally disk-shaped. A stop is carried by an upper surface of the base, and is adjustably positionable so that when a container to be filled is moved into contact with the stop, that container is correctly positioned. A body is attached to a support ledge defined about the perimeter of the base. The body is generally cylindrical, and defines an interior cavity with access through a front opening and a circular top defining an off-center hole. A slide is supported by the top, and is manually movable between a loading position wherein a spring biasing the slide is stressed, and a dispensing position wherein the spring is relaxed. A slide enclosure is attached to the upper rim of the body portion. An input funnel provides a larger upper circular rim and a smaller lower circular rim which is concentric with the upper rim when viewed from the end. Short or long dispensing funnels may be attached a collar extending from the rim of the off-center hole in the top of the body. A canister containing powdered or granular material, may be attached with an inverted orientation to the upper rim of the input funnel.

8 Claims, 6 Drawing Sheets

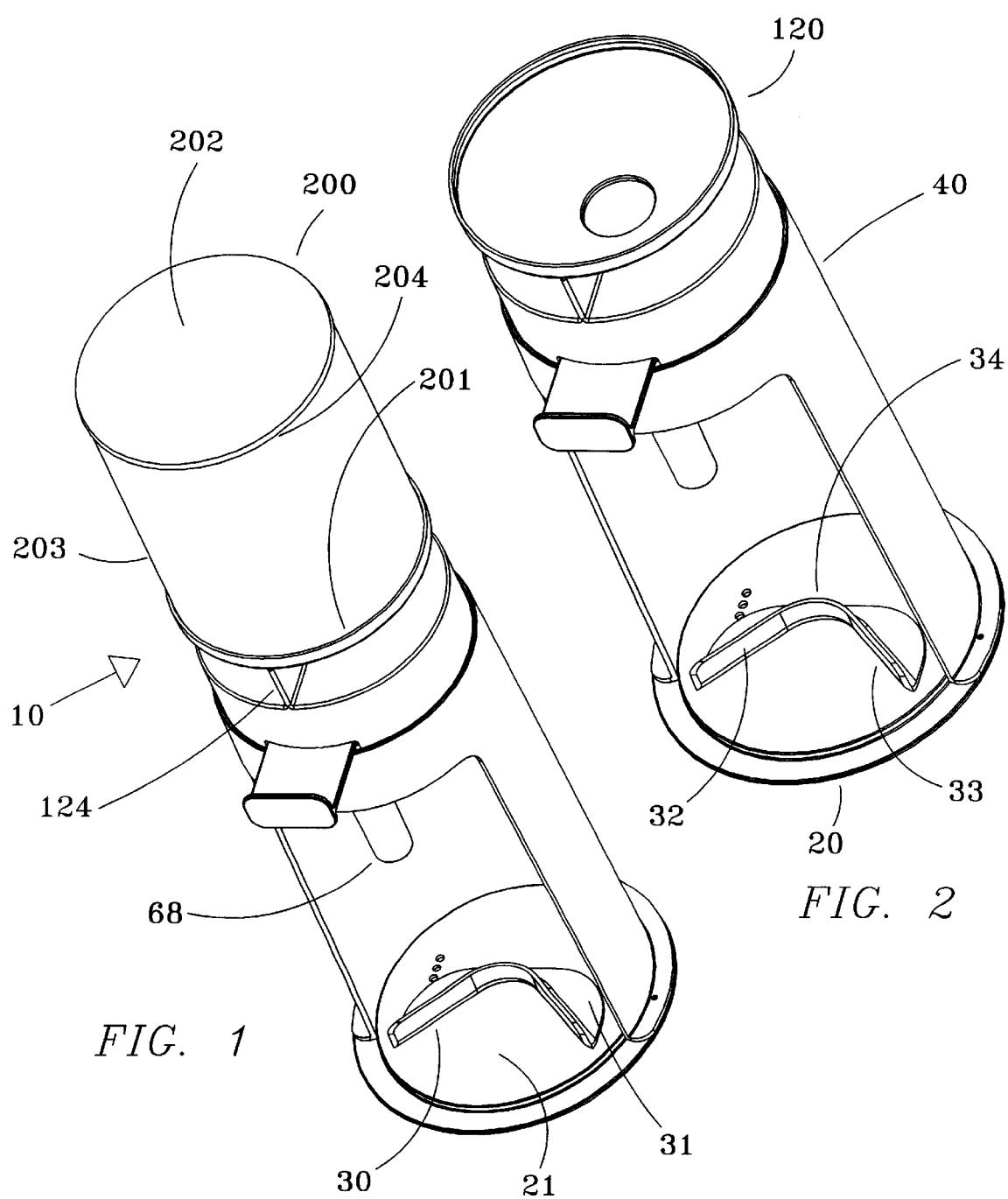

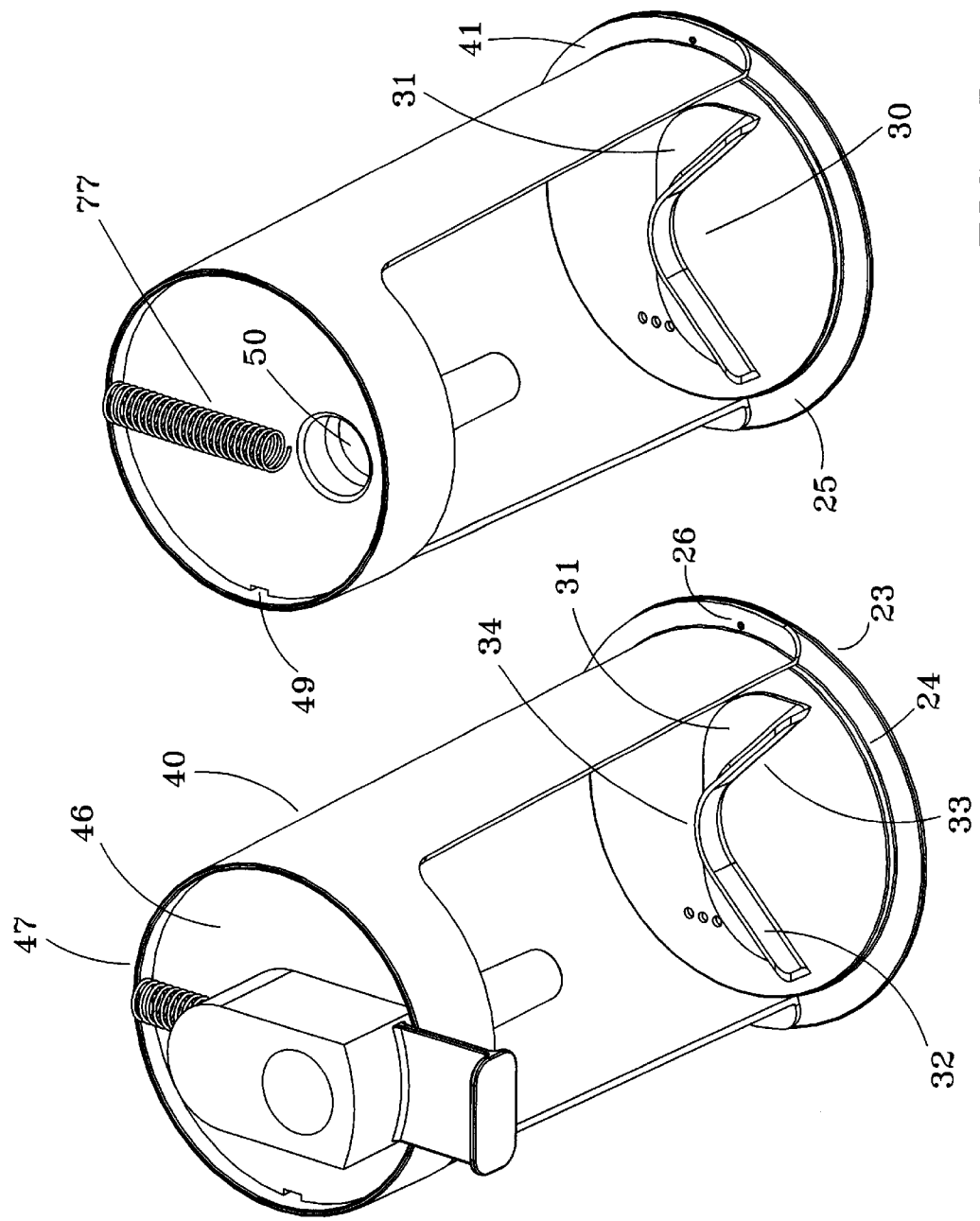

DEVICE FOR DISPENSING GRANULAR MATERIAL

CROSS-REFERENCES

This application is a continuation in part of an application having Ser. No. 09/411,724 and filing date Oct. 1, 1999, now U.S. Pat. No. 6,271,366.

BACKGROUND

Dispensing devices positioned beneath hoppers are known. Such devices have been designed to dispense solid material in powder or granular form, including coffee, sugar, salt and similar materials. Use of a sliding plate, which fills with material in a first position, and which dispenses material in a second position, is also known.

Such dispensing devices have been generally successful within the scope for which their structural design was intended. They have, however, generally failed to provide the combination of structures and associated functionality required to result in widespread adoption.

The prior art has failed to disclose the combination of structures required for one-handed operation. One-handed operation is extremely advantageous for a dispenser used with baby formula; since one of the user's hands is typically required to carry the baby only one hand is available for operation of the dispenser.

The prior art has also failed to show the combination of structures required for automatic return of the apparatus to the starting position. In prior art applications, where a slide must be moved between a first and second position, it is typically the case that such movement is best done in a two-handed manner. Particularly where a spring is compressed, it is generally the case that one hand is required to stabilize the dispenser while a second hand is required to operate the dispenser.

The prior art has also failed to adequately disclose the structures required for attachment of a replaceable bulk container in a manner which results in orientation of the bulk container in-line with the body of the dispenser, but which results in delivery of the powdered material contained in the bulk container to a location that is off-center with respect to the body of the dispenser.

The prior art has also failed to show the adjustable structures required to properly center baby bottles or similar containers of differing sizes under the dispenser in a manner that results in the mouth of the container being properly positioned. Due to the number of differently sized containers, it is commonly the case that the user must rely on manual dexterity and coordination to properly position the container.

The prior art has also failed to show the adjustable structures required to deliver the material from the dispenser into containers of differing heights without resulting in spillage. Due to the difference in the height of containers to be filled, it is commonly the case that the user may desire to lift the container to an appropriate location. However, this movement is in conflict with the inability of prior art dispensers to operate in a one-handed manner.

What is needed is a device for dispensing granular material which is easily operated in a one-handed manner. The dispensing device should provide for automatic return of all components to the starting position. The dispensing device should also provide structures for attachment of a bulk container and diversion of the material from an in-line to an off-center orientation; structures for centering a container to be filled under the dispenser, and structures for compensating for the differing heights of different containers to be filled.

SUMMARY

The present invention is directed to an apparatus that satisfies the above needs. A novel device for dispensing granular material is disclosed, which provides some or all of the following structures.

(A) A base is generally disk-shaped, having a diameter slightly larger than the diameter of the cylindrical canister of granular material.

(B) A stop is adjustably carried by the upper surface of the base. When a container to be filled is placed on the base, it is moved against the stop, thereby correctly positioning the container to be filled underneath the dispensing funnel. A preferred stop provides left and right fences, and is attached to the base by fasteners allowing the stop to be positioned in a location required by the shape and size of the container to be filled.

(C) A body portion is carried by the base, and provides a sidewall which defines an interior cavity within which the container to be filled may be located. The body portion includes a top which defines an off-enter hole through which the granular material passes.

(D) A slide is supported on the upper surface of the top of the body portion. The slide includes a body through which a hole defining a cavity sized to contain a measured amount of granular material to be dispensed. The slide is movable against the bias of a spring between a stressed loading position and a relaxed dispensing position. In the stressed loading position, the slide is manually held in a location wherein the cavity is in-line with the hole at the base of the input funnel, allowing granular material to fill the cavity. The slide is then released, allowing the spring to return the slide to the relaxed dispensing position, wherein the cavity is located above the hole defined in the top, allowing granular material to pass into a dispensing funnel.

(E) A slide enclosure is attached to the upper rim of the body portion. A top cover of the slide enclosure supports the input funnel, while a lower rim is supported by the upper rim of the body.

(F) An input funnel provides an upper circular rim which is generally concentric with the sidewall of the body when viewed on end. The lower circular rim of the input funnel is carried by the rim of the centrally located hole defined in the upper surface of the slide enclosure.

(G) Short or long dispensing funnels may be attached to a collar extending from the rim of the off-center hole in the top of the body. A short dispensing funnel may be preferred where the container to be filled is tall; a long dispensing funnel may be preferred where the container to be filled is short.

(H) A canister containing powdered or granular material, such as baby formula, coffee, coffee creamer, sugar or other food or non-food material, may be inverted and attached to the upper rim of the input funnel.

It is therefore a primary advantage of the present invention to provide a novel device for dispensing granular material that is easily operated in a one-handed manner, dispenses a pre-measured quantity and which automatically returns to a starting position when released by the user. Such operation is advantageous for parents using one hand to support a baby, or the elderly or others having arthritis or similar conditions which makes difficult the opening and closing of conventional canisters.

Another advantage of the present invention is to provide a novel device for dispensing granular material from a container that prevents contamination, degradation or evaporation of chemical components of the granular material by maintaining a seal with the container and by eliminating the need to touch the granular material with a scoop during the dispensing process.

Another advantage of the present invention is to provide a novel device for dispensing granular material that provides structures for centering a container to be filled under the dispenser.

A still further advantage of the present invention is to provide a novel device for dispensing granular material that provides structures for compensating for the differing heights of different containers to be filled in a manner which prevents spillage and which therefore provides more accurate measurement of the granular material.

DRAWINGS

These and other features, aspects, and advantages of the present invention will become better understood with regard to the following description, appended claims, and accompanying drawings where:

FIG. 1 is a perspective view of a first version of the dispensing device for dispensing granular material.

FIG. 2 is a perspective view of the dispenser of FIG. 1, having the canister removed to better reveal the structure of the input funnel.

FIG. 4 is a perspective view of the dispenser of FIG. 1, having the canister, input funnel and slide enclosure removed. The slide of the first version of the dispensing device includes an activation handle.

FIG. 5 is a view similar to that of FIG. 4, additionally having the slide removed, thereby better illustrating the off-center hole in the top surface of the body.

DESCRIPTION

Figure 3:
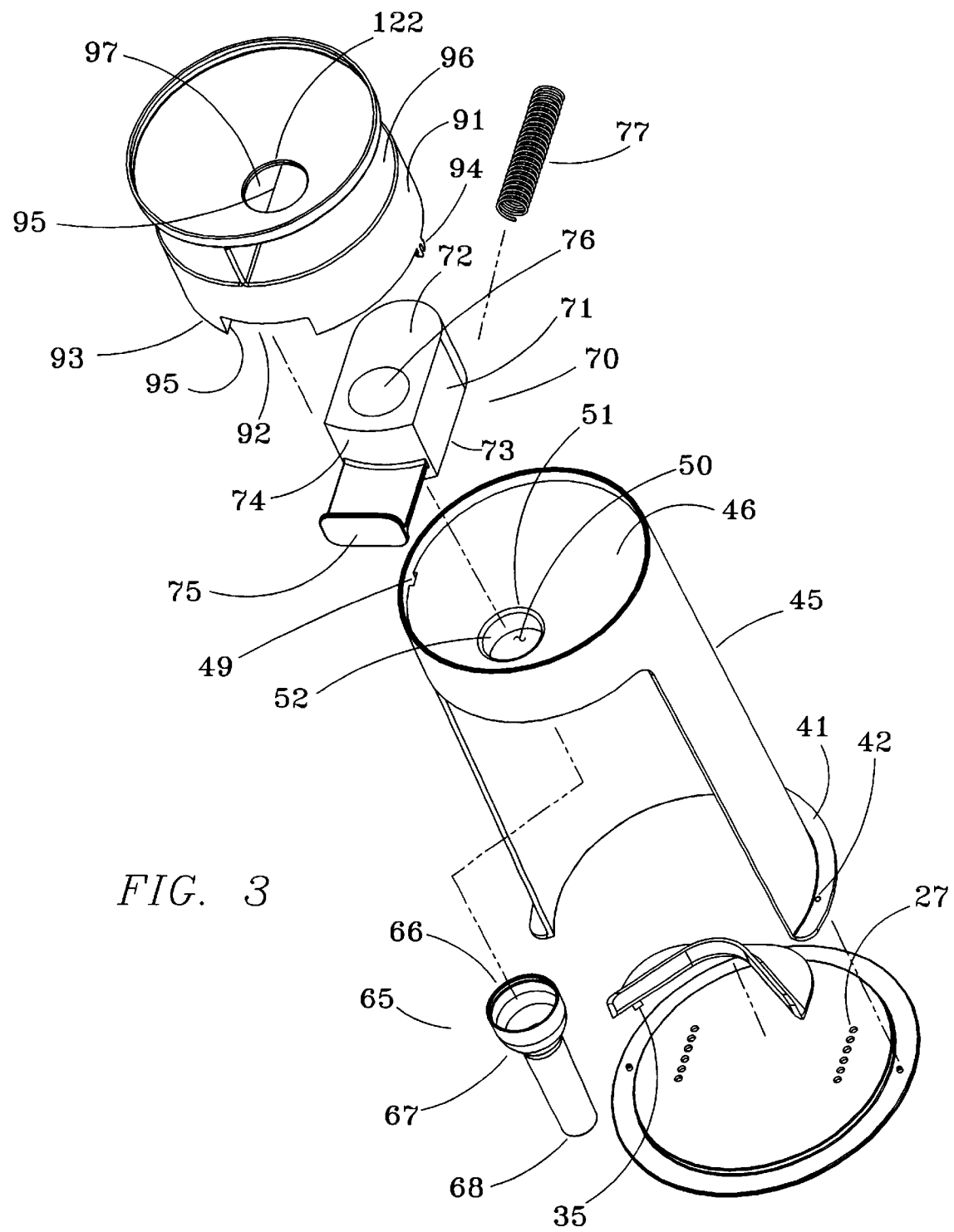
FIG. 3 is an exploded perspective view of the dispenser of FIG. 1.
Figures 6, 7:
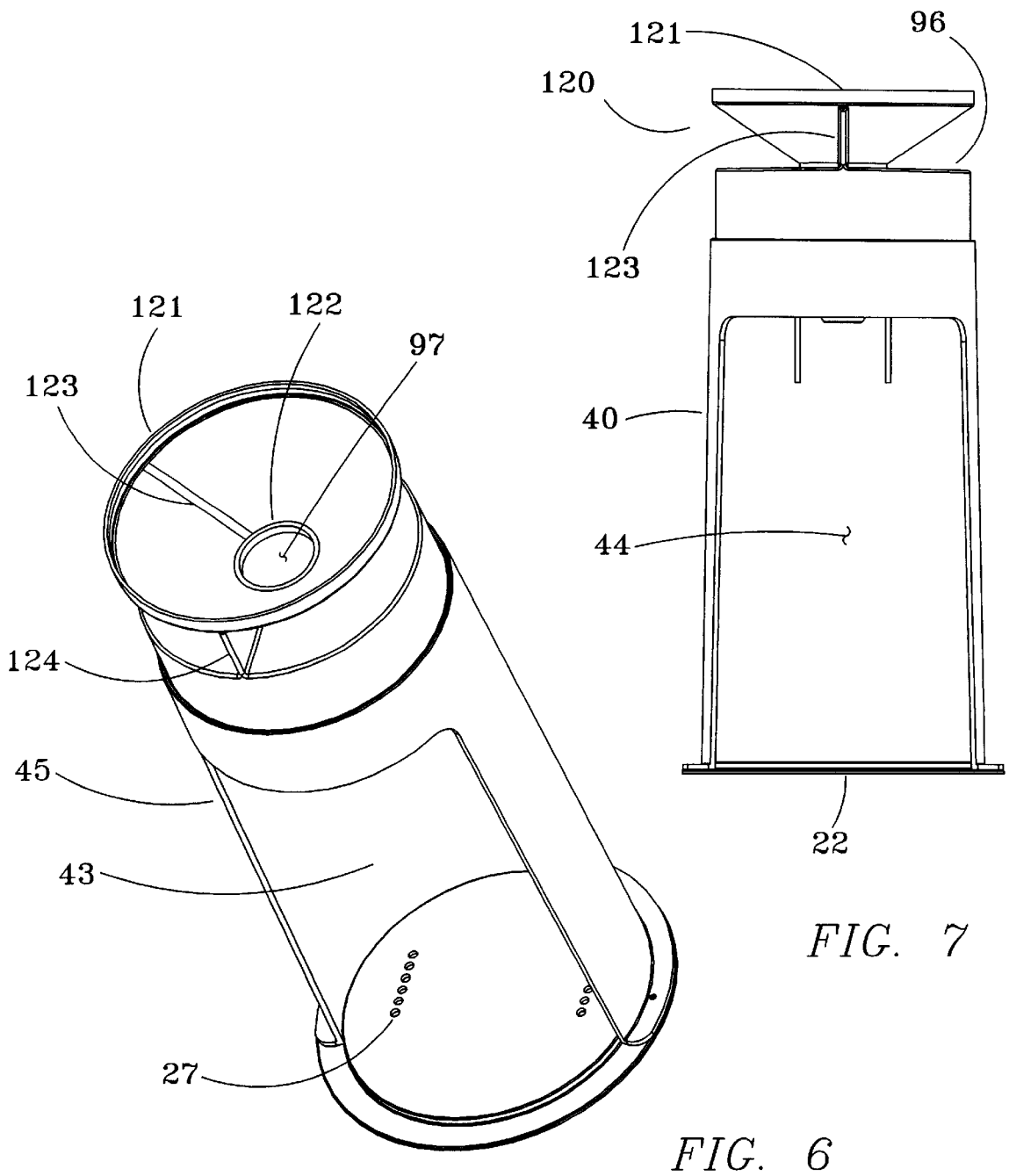
FIG. 6 is a perspective view of a second version of the dispensing device of the invention.
FIG. 7 is an orthographic view of the dispensing device of FIG. 6, showing the legs of the slide extending downwardly into the interior cavity of the body.

Referring in generally to FIGS. 1 through 5, a device 10 for dispensing granular material constructed in accordance with the principles of the invention is seen. A base 20 is generally disk-shaped. A stop 30 is carried by an upper surface of the base, and is adjustably positionable so that when a container to be filled is moved into contact with the stop, that container is correctly positioned. A body 40 is attached to a support ledge defined about the perimeter of the base. The body is generally cylindrical, and defines an interior cavity with access through a front opening and a circular top defining an off-center hole. A slide 70 is supported by the top, and is manually movable between a loading position wherein a spring biasing the slide is stressed, and a dispensing position wherein the spring is relaxed. A slide enclosure 90 is attached to the upper rim of the body portion. An input funnel 120 provides an upper circular rim having approximately the same diameter as the sidewall of the body when viewed from the end, and a smaller lower circular rim which concentric with the upper rim when viewed from the end. Short or long dispensing funnels 60, 65 may be attached a collar extending from the rim of the off-center hole in the top of the body. A canister 200 containing powdered or granular material, may be attached with an inverted orientation to the upper rim of the input funnel.

A base 20 is a generally planar disk which supports the stop 30 and the body 40. The base has an upper surface 21 and a lower surface 22. An outer rim 23 has a diameter slightly larger than the diameter of the cylindrical canister 200 of granular material. An inner rim 24 is elevated slightly above an annular support ledge 25. Fastener pegs 26 protrude from the surface of the annular support ledge, and are sized for attachment to corresponding fastener holes 42 defined in a lower flange 41 of the body 40. If desired, the location of the fastener pegs 26 and fastener holes 42 could be reversed, or alternate fastening means substituted.

As seen in FIGS. 1, 2 and 3, a plurality of adjustment holes 27 are defined in two columns between the upper and lower surfaces 21, 22 of the base. The adjustment holes allow for control over the position of the stop 30 relative to the body 40 and dispensing funnels 60, 65. In the preferred embodiment, six distinct positions are available; however, the number of positionable locations is arbitrary and could be altered to better suit any specific need.

A stop 30 is adjustably carried by the upper surface 21 of the base 20. When a container to be filled is placed on the base, the container is moved into contact with the stop, thereby correctly positioning the container to be filled underneath the dispensing funnel 60 or 65. As seen in FIGS. 1, 3 and 4, a stop 30 provides left and right fences 32, 33, which are connected by a rounded corner fence 34. The preferred shape of the fence, and the stop itself, is dependent to a large degree on the expected size and shape of the container to be filled. The stop of FIGS. 1 and 3 is particularly adapted to a container to be filled having a generally square cross-section with rounded corners. However, for example, where the container to be filled has a round cross-section, the stop may provide a single, rounded fence.

A footing 31 of the stop 30 is attached to the base 20 by fasteners allowing the stop to be positioned in a location required by the shape and size of the container to be filled. In a preferred embodiment, a pair of fastener pegs 35 are sized to engage one adjustment hole 27 in each of the two columns. By careful selection of the adjustment holes chosen for attachment to the fastener pegs, the location of the stop may be regulated to result in correct positioning of the container to be filled under the dispensing funnel.

As seen in FIGS. 1, 2 and 3, a body 40 portion is carried by the base 20. A lower portion of the body defines a flange 41 through which fastener holes 42 are defined. The fastener holes 42 are sized for attachment to the fastener pegs 26 of the supporting ledge 25 of the base.

A sidewall 45 having a front opening 43 defines an interior cavity 44. The upper portion of the sidewall supports a generally round, planar top 46 located incrementally below an upper rim 47 of the sidewall. Diametrically opposed openings 49 defined in the top 46 are sized for releasable connection to the locking tabs 94 of the slide enclosure 90.

As seen in FIGS. 3 and 5, an off-center hole 50 defined in the top 46 allows passage of granular material. The location of the hole 50 in the top 46 is off-center, in that the rim 51 of the hole is not concentric with the circular top 46 and rim 47 of the sidewall 45 of the body 40. As seen in FIGS. 3 and 5, the hole 50 is located toward the front of the dispensing device. A collar 52 extends from the lower surface of the top and allows frictional attachment of either dispensing funnel 60, 65.

Figure 8:
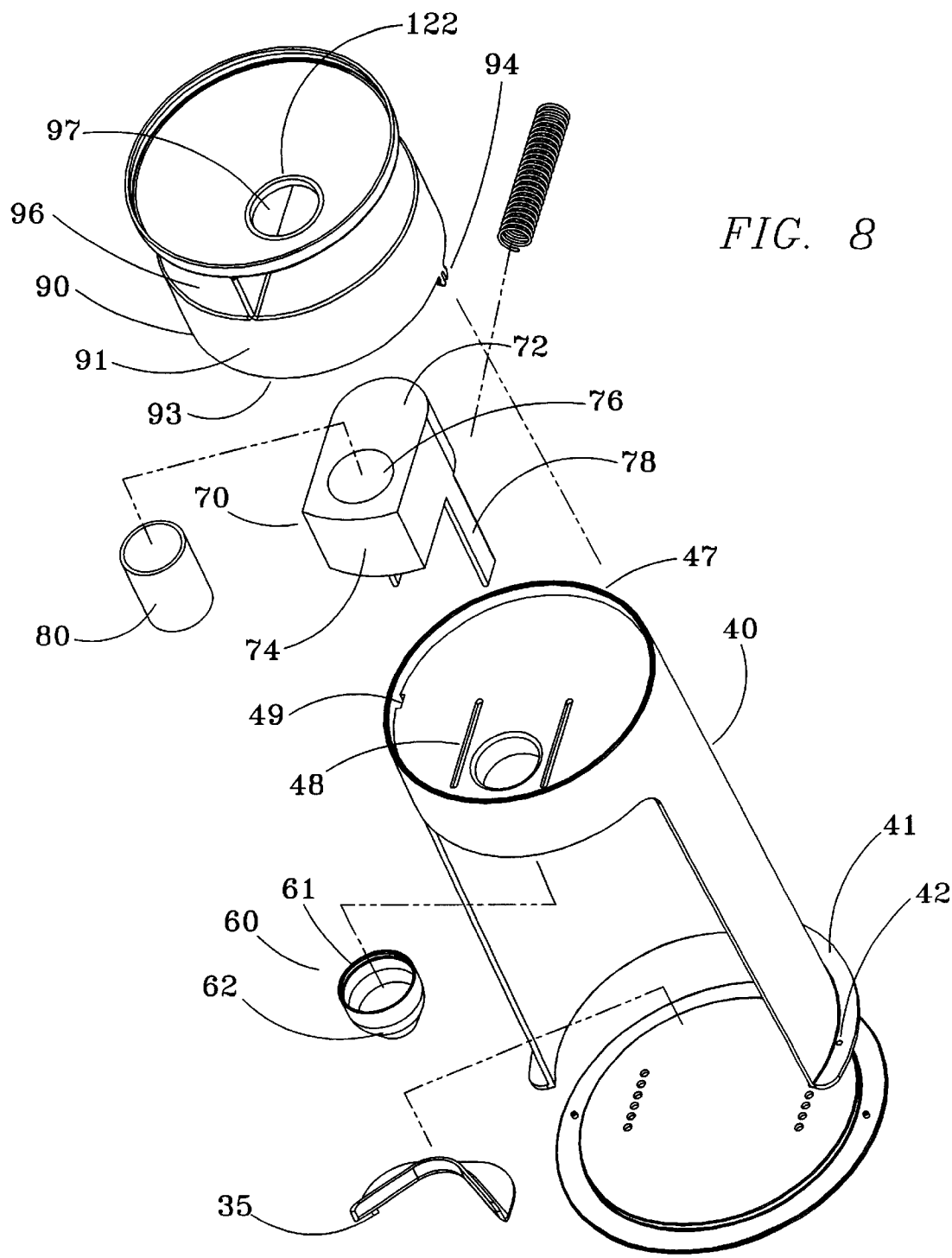
FIG. 8 is an exploded perspective view of the dispensing device of FIG. 6.

Referring to FIG. 8, it can be seen that in the second version of the dispensing device, slots 48 are defined in the top surface 46 of the body 40. The slots allow for the movement of the legs 78 of the slide 70 between the loading position and the dispensing position.

As seen in FIGS. 3, 4 and 8 a slide 70 is supported on the upper surface of the top 46 of the body portion 40. The slide includes a body 71 having upper and lower surfaces 72, 73 between which a cavity 76 is defined. The cavity 76 is generally cylindrical, having upper and lower circular end openings sized to match the diameter of the hole 50 defined in the top 46 and the hole 97 defined in the top cover 96 of the slide enclosure. The body also provides a rounded edge 74 having a curvature which conforms to that of the rim 47 of the body 40.

The size of the cavity 76 may be reduced by installation of the insert 80 into the cavity, as seen in FIG. 8. A preferred insert is held in place by frictional contact with the surfaces defining the cavity.

The slide 70 is biased into the forward position seen in FIG. 4 by a spring 77. A first end of the spring 77 is carried within a socket defined on the back portion of the slide 70, while a second end of the spring rests against the rim 47 of the sidewall 45 of the body 40.

When the spring is in the relaxed and extended state, the slide is in the forward or dispensing position. In the dispensing position, the cavity 76 of the slide is located above the hole 50 in the top 46 of the body, thereby allowing granular material stored in the cavity 76 to fall through the dispensing funnel 60 or 65.

When the spring is in the compressed or stressed state, the slide is in the rearward or loading position. In the loading position, the cavity 76 of the slide is located under the rim 122 of the funnel 120, which defines the hole 97 in the top cover 96 of the slide enclosure 90. In this position, a quantity of granular material from the input funnel 120 is transferred into the cavity 76.

As seen in FIG. 3, in a first version of the invention, the slide is moved by manual operation of the activation handle 75. By pushing the activation handle inwardly, the spring is compressed and the slide moves to the stressed loading position. By releasing the activation handle, the spring is able to move the slide into the relaxed dispensing position.

As seen in FIG. 8, in a second version of the invention, the slide is moved by contact between the container to be filled and the legs 78 which extend from the body of the slide, through the slots 48, and into the interior cavity 44 defined within the body 40 of the dispenser. Contact between the container and the legs operates the slide in a manner similar to manual operation of the activation handle 75.

Figure 9:
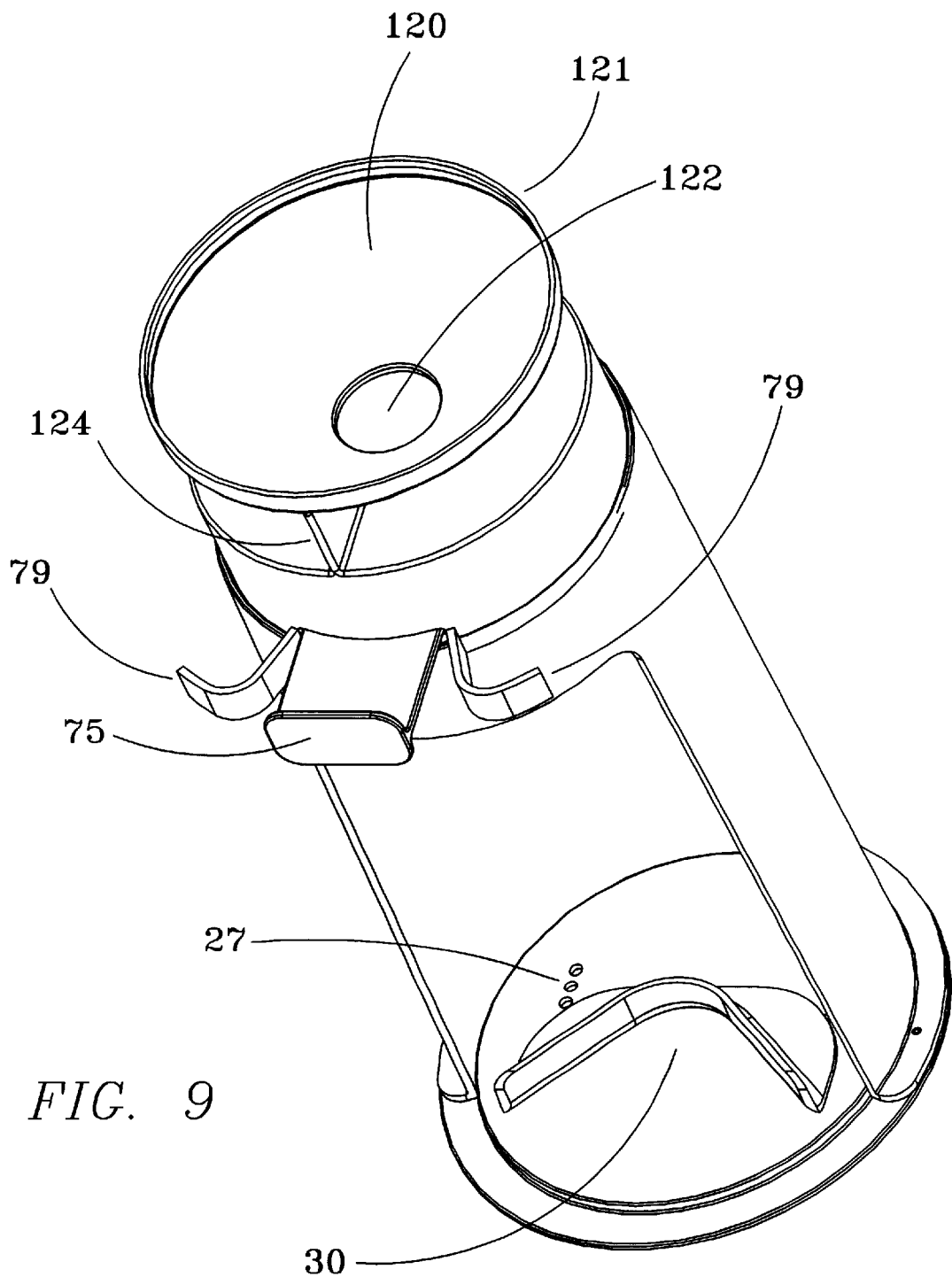
FIG. 9 illustrates a modification adaptable particularly to the first version of the dispensing device, including first and second finger supports which allow the dispensing device to be restrained by two fingers while the thumb is used to press the activation handle.

As seen in FIG. 9, optional finger supports 79 may be provided to restrain the movement of the dispensing device 10 while the activation handle 75 is pressed. The finger supports may be carried by the rounded sidewall 91 of the slide enclosure 90, or by other suitable location. In a preferred embodiment, left and right finger supports 79 allow the first and second fingers of the user to restrain the dispensing device while the spring 77 is compressed.

Alternatively, or additionally, a highly frictional covering or coating may be provided on the lower surface 22 of the base 20. Such a frictional surface would tend to prevent movement of the dispensing device when the activation handle is pressed.

As particularly seen in FIG. 3, a slide enclosure 90 is attached to the upper rim of the body portion 40. Diametrically opposed locking tabs 94 are positioned to engage the openings 49 in the top 46, and allow releasable attachment of the slide enclosure to the body 40.

A rounded sidewall 91 of the slide enclosure has incrementally less outside diameter than the inside diameter of the rim 47 of the body 40. Therefore, as seen in FIG. 1, in assembly, the rounded sidewall 91 is inserted inside the rim 47 of the sidewall 45 of the body 40, allowing the rim 93 of the slide enclosure to rest on the outer perimeter of the top 46. The inside surface of the rounded sidewall of the slide enclosure is sized so that the rounded surface 74 of the slide 70 rests flush against the rounded sidewall 91 of the slide enclosure when the slide is in the relaxed dispensing position.

As seen in the version of the invention illustrated in FIG. 3, a slot 92 is defined in the sidewall 91 of the slide enclosure. As seen in FIGS. 1–4, the activation handle 75 of the slide extends through the slot 92, to a location where it may be manually activated by the user.

The slide 70 moves between opposed sidewalls 95 forming a travel slot within the slide enclosure. The sidewalls 95 restrict the motion of the slide to movement in one dimension, between the forward dispensing position and the rearward loading position.

A hole 97 is defined through the top cover 96 of the slide enclosure and is aligned with the lower rim 122 of the input funnel. The hole allows the passage of granular material from the input funnel 120 into the cavity 76 defined in the slide 70. The rim of the hole 97 is concentric with respect to the top cover 96 when viewed from the end. As a result, the hole 97 is in-line with the cavity 76 defined in the slide 70 when the slide is in the stressed loading position, thereby allowing granular to pass from the input funnel 120 into the cavity 76.

As seen in FIGS. 2, 3 and 8, an input funnel 120 transfers granular material from the canister 200 through the hole 97 in the slide enclosure 90, and into the cavity 76 defined within the slide 70.

An upper circular rim 121 of the input funnel is generally concentric with the sidewall of the body when viewed on end. The upper circular rim is sufficiently flexible and resilient to allow releasable attachment of the open end 201 of the canister 200.

A lower rim 122 encompasses the hole 97 defined in the top cover 96 of the slide enclosure. The lower rim is attached to the rim of the hole 97, thereby supporting the input funnel 120 in a position above the slide enclosure 90, as seen in FIGS. 1 and 2. A support 124, seen in FIGS. 1 and 3, provides additional rigidity to the funnel, allowing it to support the weight of the canister.

As seen in FIG. 1A, a version of the input funnel provides a clear viewing window 123 which allows the user to view the powdered or granular material carried within. When the clear viewing window reveals that the quantity of material is low, the user is alert to the need to replace the canister.

Short or long dispensing funnels may be attached the collar 52 which extends downwardly from the rim 51 of the hole 50 in the top 46 of the body 40. A short dispensing funnel 60 may be preferred where the container to be filled is tall; a long dispensing funnel 65 may be preferred where the container to be filled is short.

As seen in FIG. 2, the short dispensing funnel 60 includes a rim 61 sized for frictional fit on the collar 52 encompassing the hole 50 in the top 46 of the body 40. The funnel portion 62 tends to concentrate the granular material into the opening of a taller container to be filled located in the interior cavity 44 of the body.

Continuing to refer to FIG. 2, the long dispensing funnel 65 includes a similar rim 66 and funnel 67. An extension tube 68 keeps the granular material concentrated as that material is transferred from the cavity 76 to the container to be filled, and therefore prevents dissipation and spillage of the granular material when the container to be filled is relatively short.

A canister 200 containing powdered or granular material, such as baby formula, coffee, coffee creamer, sugar or other food or non-food material, may be attached to the dispensing device 10. In a typical application, the canister is disposable and is full of powdered or granular material when purchased. In this situation, the canister provides an open top end 201 and a closed bottom end 202. In use, the canister is inverted, with the open end 201 attached to the upper rim 121 of the input funnel. As a result, granular material is transferred from the canister into the input funnel 120.

As seen in FIG. 1A, the canister may alternatively be designed with a resealable lid 204 which closes the bottom end 202. Such a canister with a lid on the bottom end would be adapted for refilling with material from a large bulk container, and would therefore tend to remain in the inverted position indefinitely. The lid 204 would be removed, the canister refilled, and the lid replaced. In this version of the invention, the canister would not need to be removed from the upper rim of the input funnel for refilling.

Continuing to refer to FIG. 1A, the canister may optionally provide a clear viewing window 203 defined vertically, between the top and bottom ends of the canister. The clear viewing window is typically made of transparent plastic. The clear viewing window allows the user to monitor the quantity of granular material contained within the canister, and to plan ahead to purchase additional granular material. When additional material is needed, the resealable lid 204 is removed, allowing the addition of material from a bulk source.

A first end of the spring 77 is inserted into the slide 70, which is placed on the top 46 of the body. In the version of the invention of FIG. 3, the activation handle 75 is extended from the activation handle slot 92. In the version of the invention of FIG. 8, the legs 78 are inserted into slots 48 in the top 46 of the body. The slide enclosure 90 is then placed over the slide, trapping the slide between the opposed sidewalls 95 of the slide pathway. The locking tabs 94 of the slide enclosure are gently inserted into the openings 49 in the top 46 of the body, where they lock into place.

The fastener pegs 26 of the base 20 are attached to the fastener holes 42 of the flange 41 of the body 40, thereby securing the base to the body.

The fastener pegs 35 of the stop 30 are attached to a pair of the adjustment holes 27 defined in the base. The adjustment holes selected are those which result in a desirable location for the stop. The location of the stop should be selected so that for a given container to be filled, when that container is placed within the interior cavity 44 and against the stop, the mouth of the container is located directly under the dispensing funnel.

Either the short or long dispensing funnel 60, 65 should be attached to the collar 52. Where the container to be filled will fit under the long dispensing funnel, it is typically desirable to use this dispensing funnel. Where the container to be filled is too tall to fit under the long dispensing funnel, the short dispensing funnel should be used.

Once assembled, the dispensing device is inverted, so that the upper rim 121 of the input funnel may be attached to the open top end 201 of the canister 200 of granular material. Such a canister may contain baby formula or other food or non-food product. Once attached, the dispensing device 10 and attached canister 200 may be oriented as seen in FIG. 1, with the canister in an inverted position on top of the dispensing device, and the base 20 of the dispensing device supported by a table or counter top.

To dispense granular material from the version of the invention seen in FIG. 3, the user places the container to be filled against the stop 30, and under the dispensing funnel. The user then manually pushes on the dispensing handle 75, causing the spring 77 to compress and causing the slide to move into the loading position. Material from the input funnel 120 moves into the cavity 76 defined within the slide.

The user then releases the activation handle 75, and the spring 77 relaxes, pushing the slide into the dispensing position, wherein the rounded surface 74 is touching the rim 47 of the body. In this location, the granular material carried within the cavity 76 drops through the dispensing funnel 60 or 65.

To dispense granular material from the version of the invention seen in FIG. 8, the user places the container to be filled against the stop 30, and under the dispensing funnel. This causes the container to be filled to push on the legs 78 of the slide, thereby compressing the spring 77 and pushing the slide to move into the loading position. Material from the input funnel 120 moves into the cavity 76 defined within the slide. Once the material has filled the cavity, the user pulls the container to be filled backward, to a position under the dispensing funnel. The spring returns the slide to the relaxed dispensing position, and the granular material passes through the dispensing funnel into the container to be filled.

The previously described versions of the present invention have many advantages, including a primary advantage of providing a novel device for dispensing granular material that is easily operated in a one-handed manner, dispenses a pre-measured quantity and which automatically returns to a starting position when released by the user. Such operation is advantageous for parents using one hand to support a baby, or the elderly or others having arthritis or similar conditions which makes difficult the opening and closing of conventional canisters.

Another advantage of the present invention is to provide a novel device for dispensing granular material from a container that prevents contamination of the granular material by maintaining a seal with the container and by eliminating the need to touch the granular material with a scoop during the dispensing process.

Another advantage of the present invention is to provide a novel device for dispensing granular material that provides structures for centering a container to be filled under the dispenser.

A still further advantage of the present invention is to provide a novel device for dispensing granular material that provides structures for compensating for the differing heights of different containers to be filled in a manner which prevents spillage and which therefore provides more accurate measurement of the granular material.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while the preferred embodiment of the dispenser is oriented in such a manner the hole defined in the slide fills when in the relaxed state, and discharges in the stressed state, the activities associated with these states could be reversed. Similarly, while various fastening means have been defined, including for example, fastener pegs and corresponding fastener holes, it should be clear that in some cases the location of the pegs and holes could be reversed, or that in all cases equivalent fasteners could be used. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A dispensing device for releasing a measured quantity of granular material from a canister containing granular material, the dispensing device comprising:
   (A) a body portion having a sidewall which defines an interior cavity and having a top which defines a hole;
   (B) a disk-shaped base, supporting the body portion, the disk-shaped base defining a plurality of adjustment holes between an upper and a lower surface;
   (C) a slide, supported on an upper surface of the top of the body portion, the slide having a body within which a cavity is defined;
   (D) activation means, extending from the slide, for moving the slide between a loading position and a dispensing position;
   (E) a spring, in contact with the slide, wherein the spring biases the position of the slide;
   (F) a slide enclosure, attached to an upper rim of the body portion, enclosing the slide; and
   (G) an input funnel having an upper circular rim which is concentric with the sidewall of the body when viewed on end, and a lower circular rim which is carried by a rim of a hole defined in the upper surface of the slide enclosure.

2. The dispensing device of claim 1, wherein the activation means comprises an activation handle.

3. The dispensing device of claim 2, additionally comprising left and right finger supports carried by the slide enclosure.

4. The dispensing device of claim 1, wherein the activation means comprises at least one leg extending through a slot defined in the top of the body into an interior cavity of the body.

5. The dispensing device of claim 4, further comprising a stop, adjustably carried by the adjustment holes, having at least one fence extending substantially perpendicularly from the upper surface of the disk-shaped base.

6. The dispensing device of claim 5, further comprising a dispensing funnel attached to a collar extending from a rim of the hole defined in the top of the body portion.

7. The dispensing device of claim 6, further comprising attachment, means defined on the upper circular rim of the input funnel, for attachment of a canister containing granular material.

8. A dispensing device, for releasing a measured quantity of granular material, comprising:
   (A) a disk-shaped base defining a plurality of adjustment holes between an upper and a lower surface;
   (B) a stop, adjustably carried by the adjustment holes, having at least one fence extending substantially perpendicularly from the upper surface of the disk-shaped base;
   (C) a body portion, carried by the base, having a sidewall which defines an interior cavity and having a top which defines a hole;
   (D) a slide, supported on an upper surface of the top of the body portion, the slide having a body within which a cavity is defined;
   (E) activation means, extending from the slide, for moving the slide between a stressed loading position and a relaxed dispensing position;
   (F) a spring, in contact with the slide, wherein the spring biases the slide into a dispensing position,
   (G) a slide enclosure, attached to an upper rim of the body portion, enclosing the slide;
   (H) an input funnel having an upper circular rim which is concentric with the sidewall of the body when viewed on end, and a lower circular rim which is carried by a rim of a hole defined in the upper surface of the slide enclosure;
   (I) a canister, attached to the upper circular rim of the input funnel, having a clear viewing window defined vertically, between a top end and a bottom end of the canister;
   (J) a dispensing funnel attached to a collar extending from a rim of the hole defined in the top of the body portion; and
   (K) attachment means, defined on the upper circular rim of the input funnel, for attachment of a canister containing granular material.

* * * * *